United States Patent
Soulier

(10) Patent No.: US 11,595,068 B2
(45) Date of Patent: Feb. 28, 2023

(54) METHOD OF DEMODULATION OF A STEREOPHONIC SIGNAL

(71) Applicants: Continental Automotive France, Toulouse (FR); Continental Automotive GmbH, Hannover (DE)

(72) Inventor: Gérald Soulier, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 51 days.

(21) Appl. No.: 17/289,045

(22) PCT Filed: Nov. 21, 2019

(86) PCT No.: PCT/EP2019/082123
§ 371 (c)(1),
(2) Date: Apr. 27, 2021

(87) PCT Pub. No.: WO2020/104603
PCT Pub. Date: May 28, 2020

(65) Prior Publication Data
US 2021/0409054 A1    Dec. 30, 2021

(30) Foreign Application Priority Data

Nov. 21, 2018   (FR) ...................................... 1871682

(51) Int. Cl.
*H04B 1/16*    (2006.01)
*H04H 40/45*   (2008.01)

(52) U.S. Cl.
CPC ......... *H04B 1/1653* (2013.01); *H04B 1/1676* (2013.01); *H04H 40/45* (2013.01)

(58) Field of Classification Search
CPC .. H04B 1/1653; H04B 1/1661; H04B 1/1669; H04B 1/1676; H04B 1/1684; H04H 40/45
See application file for complete search history.

(56) References Cited

U.S. PATENT DOCUMENTS

| 4,249,038 A | 2/1981 | Stienstra |
| 4,300,020 A | 11/1981 | Toyomaki |
| 4,932,058 A | 6/1990 | Marrah |
| 4,933,972 A | 6/1990 | Okanobu |
| 5,357,574 A | 10/1994 | Whitecar |
| 9,337,944 B1 * | 5/2016 | Lou ...................... H04B 1/1669 |

(Continued)

FOREIGN PATENT DOCUMENTS

| GB | 2021361 A | 11/1979 |
| WO | 9414246 A1 | 6/1994 |

OTHER PUBLICATIONS

Chinese Office Action for Chinese Application No. 201980076529.2, dated Jan. 10, 2022, with translation, 14 pages.

(Continued)

*Primary Examiner* — Tuan Pham
(74) *Attorney, Agent, or Firm* — RatnerPrestia

(57) ABSTRACT

A method for demodulating a multiplexed stereophonic signal, the signal including a signal called the sum signal, a signal called the difference signal, and a pilot signal, the method including the following steps: removing the pilot frequency from the multiplexed stereophonic signal, the resulting signal being called the pilotless signal, and subtracting the sum signal from the pilotless signal.

13 Claims, 3 Drawing Sheets

(56) References Cited

U.S. PATENT DOCUMENTS

2004/0101143 A1* 5/2004 Avalos .................... H04R 5/04
                                                        381/2

OTHER PUBLICATIONS

International Search Report and Written Opinion for International Application No. PCT/EP2019/082123, dated Jan. 21, 2020, with partial English translation, 8 pages.
International Search Report and Written Opinion for International Application No. PCT/EP2019/082123, dated Jan. 21, 2020, 12 pages (French).

* cited by examiner

METHOD OF DEMODULATION OF A STEREOPHONIC SIGNAL

CROSS REFERENCE TO RELATED APPLICATIONS

This application is the U.S. National Phase Application of PCT International Application No. PCT/EP2019/082123, filed Nov. 21, 2019, which claims priority to French Patent Application No. 1871682, filed Nov. 21, 2018, the contents of such applications being incorporated by reference herein.

FIELD OF THE INVENTION

The invention relates to a method for demodulating a multiplexed stereophonic signal, in particular implemented by a radio system for a motor vehicle, and in particular a system configured to receive FM channels.

BACKGROUND OF THE INVENTION

Such a stereophonic signal is composed of a set of a first signal, called the sum signal, which is a sum of two, left and right, monophonic signals, and of a second signal, called the difference signal, which is a difference of said two monophonic signals, and has been modulated by a carrier, preferably at 38 kHz. To generate this 38 kHz carrier, the stereophonic signal also comprises a pilot signal, the frequency of which is that of the 38 kHz carrier divided by two.

Demodulation of the stereophonic signal may be difficult, even problematic, both due to the complex extraction of the pilot signal and due to the use of various filters which negatively affect the degree of total harmonic distortion and the separation of the left/right channels. This is the case in particular when the energy of the sum signal is higher than that of the difference signal, the known demodulation methods not allowing the amplitude of the sum signal to be attenuated sufficiently in order to cleanly recover the difference signal.

SUMMARY OF THE INVENTION

The aim of an aspect of the invention is to at least partially overcome these drawbacks.

To that end, one subject of the invention is a method for demodulating a multiplexed stereophonic signal, the signal comprising a signal called the sum signal, which is a sum of two monophonic signals, a signal called the difference signal, which is a difference of said two monophonic signals, and a pilot signal at a frequency called the pilot frequency serving as a reference for performing a frequency transposition of the difference signal on the basis of a carrier signal, the method comprising the following steps: removing the pilot frequency from the multiplexed stereophonic signal, the resulting signal being called the pilotless signal, and subtracting the sum signal from the pilotless signal, the resulting signal being called the untransposed difference signal.

Thus, by virtue of an aspect of the present invention, the pilot signal and the sum and difference signals are extracted in an optimal manner, which improves the degree of total harmonic distortion.

According to another feature of an aspect of the invention, a rejection filter is used in the step of removing the pilot frequency.

According to another feature of an aspect of the invention, the method comprises a step of applying a delay to the pilotless signal prior to the subtraction step.

According to another feature of an aspect of the invention, the method comprises a step of regenerating the carrier signal on the basis of the multiplexed stereophonic signal and the pilotless signal.

According to another feature of an aspect of the invention, the step of regenerating the carrier signal comprises a subtraction step in which the pilotless signal is subtracted from the multiplexed stereophonic signal, the subtraction step being followed by a step of applying a delay.

According to another feature of an aspect of the invention, the step of regenerating the carrier signal comprises a step of using a phase-locked loop subsequent to the step of applying a delay.

According to another feature of an aspect of the invention, the step of regenerating the carrier signal comprises a step of doubling the pilot frequency subsequent to the step of using a phase-locked loop.

According to another feature of an aspect of the invention, the step of regenerating the carrier signal comprises a step of filtering by means of a band-pass filter, subsequent to the step of doubling the frequency, the resulting signal being called the regenerated carrier signal.

According to another feature of an aspect of the invention, the method comprises a step of multiplying the untransposed difference signal and the regenerated carrier signal.

According to another feature of an aspect of the invention, the method comprises a step of filtering by means of a low-pass filter so as to recover the difference signal.

According to another feature of an aspect of the invention, the method comprises a step of filtering by means of a low-pass filter prior to the step of subtracting the pilotless signal from the sum signal.

According to another feature of an aspect of the invention, comprising a step of recovering the sum signal by applying a delay to the signal resulting from the step of filtering by means of a low-pass filter prior to the step of subtracting the pilotless signal from the sum signal.

Another subject of the invention is a device for implementing the method as described above.

BRIEF DESCRIPTION OF THE DRAWINGS

Other features, details and advantages of aspects of the invention will become apparent from reading the following detailed description and analyzing the appended drawings, in which.

DETAILED DESCRIPTION OF THE PREFERRED EMBODIMENTS

Figure 1:
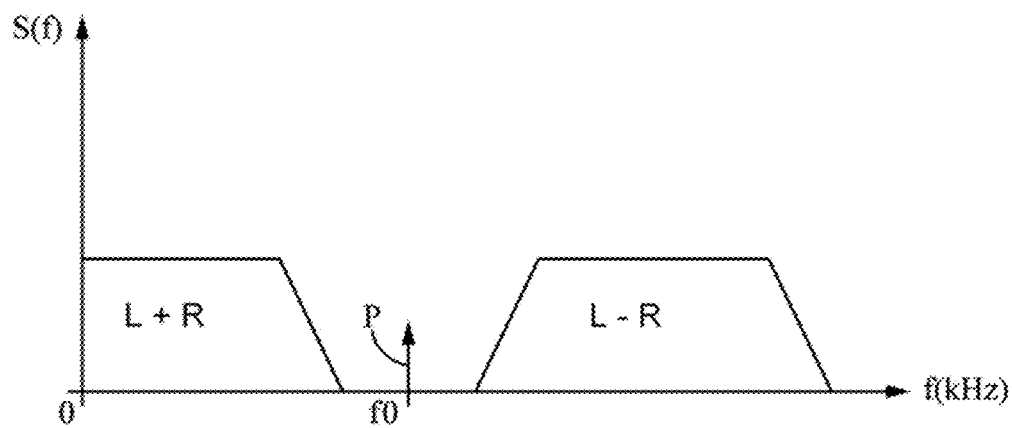
FIG. 1 illustrates a frequency spectrum of a stereophonic signal to which a demodulation method according to an aspect of the present invention is applied.

One subject of the invention is a demodulation method applicable in particular to a signal S(f) illustrated in FIG. 1. The signal S(f) is a multiplexed stereophonic signal. Another subject of the invention is a device for implementing the demodulation method. The device is preferably a radio system for a motor vehicle, and in particular a system configured to receive FM channels.

The signal S(f) comprises a first signal, called the sum signal, in a first frequency band, and which is a sum of two monophonic signals, denoted by L and R (for left and right). As can be seen in FIG. 1, the sum signal is represented by the sign L+R.

The signal S(f) also comprises a second signal, called the difference signal, in a second frequency band, and which is a difference of the two monophonic signals L and R. As can be seen in FIG. 1, the difference signal is represented by the sign L−R.

The difference signal has been modulated by a carrier at a given frequency, for example 38 kHz.

The signal S(f) also comprises a signal at a pilot frequency f0, which corresponds to the frequency of the 38 kHz carrier divided by two, i.e. 19 kHz. Recovery of the pilot signal allows coherent demodulation, as will be described later. The pilot signal is represented by the letter P in FIG. 1.

As can be seen in FIG. 1, the frequencies of the frequency band of the sum signal L+R are lower than the pilot frequency f0 while the frequencies of the frequency band of the difference signal L−R are higher than the pilot frequency f0.

Figure 2:
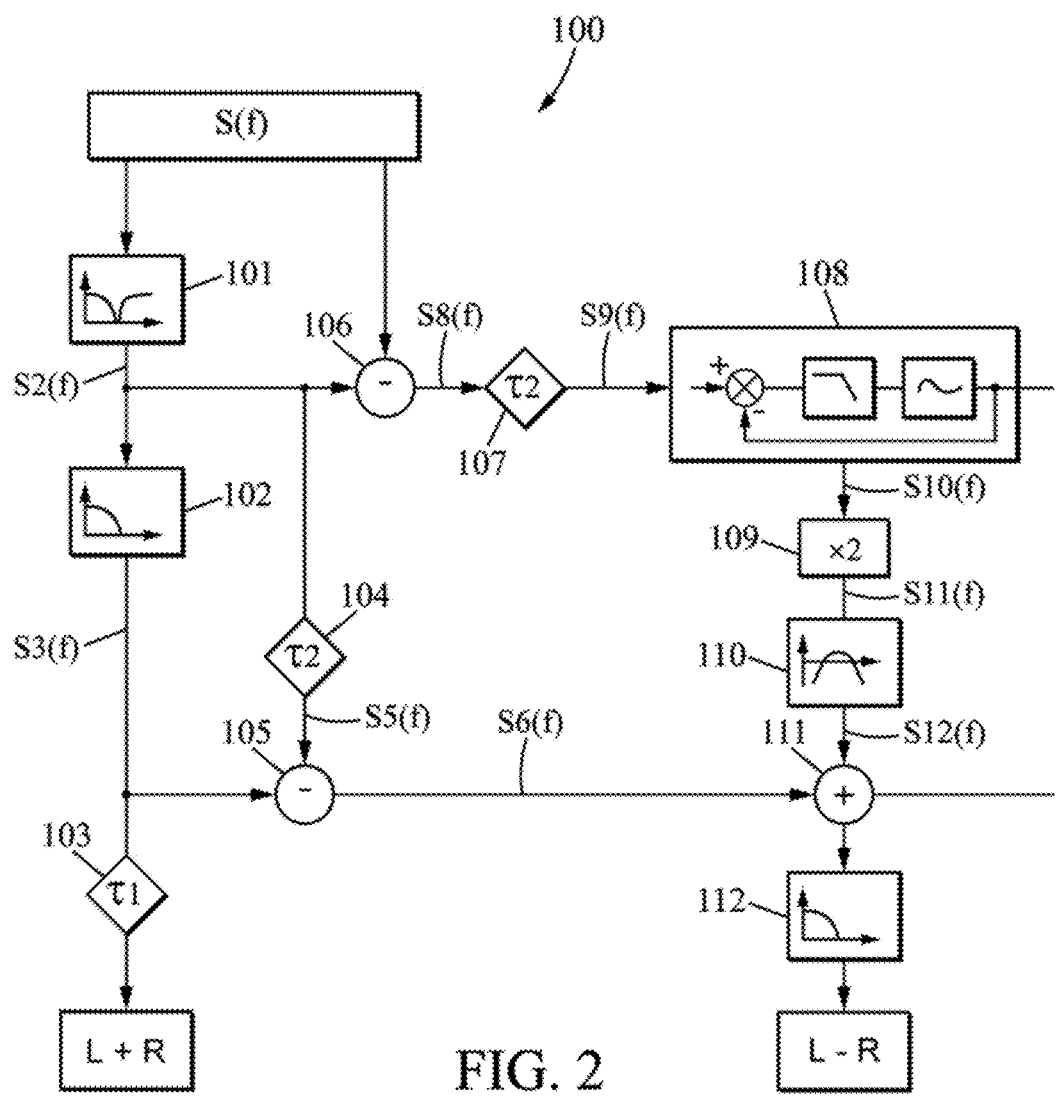
FIG. 2 illustrates a schematic view of a device for implementing the demodulation method according to an aspect of the present invention.

The demodulation method and the device for implementing the method are now described in detail with reference to FIGS. 2 and 3.

The demodulation method is referenced 1 while the implementation device is referenced 100.

The demodulation method 1 comprises a first step 2, during which the pilot frequency is removed from the multiplexed stereophonic signal S(f). This step is denoted by REMO in FIG. 3, and the resulting signal is called the pilotless signal, denoted by S2(f).

Preferably, the implementation device comprises one or more rejection filters 101. Each rejection filter is preferably an infinite impulse response filter, of second order, which ensures that the rejected band is very fine around the pilot frequency f0, as illustrated in FIG. 2.

Figure 3:
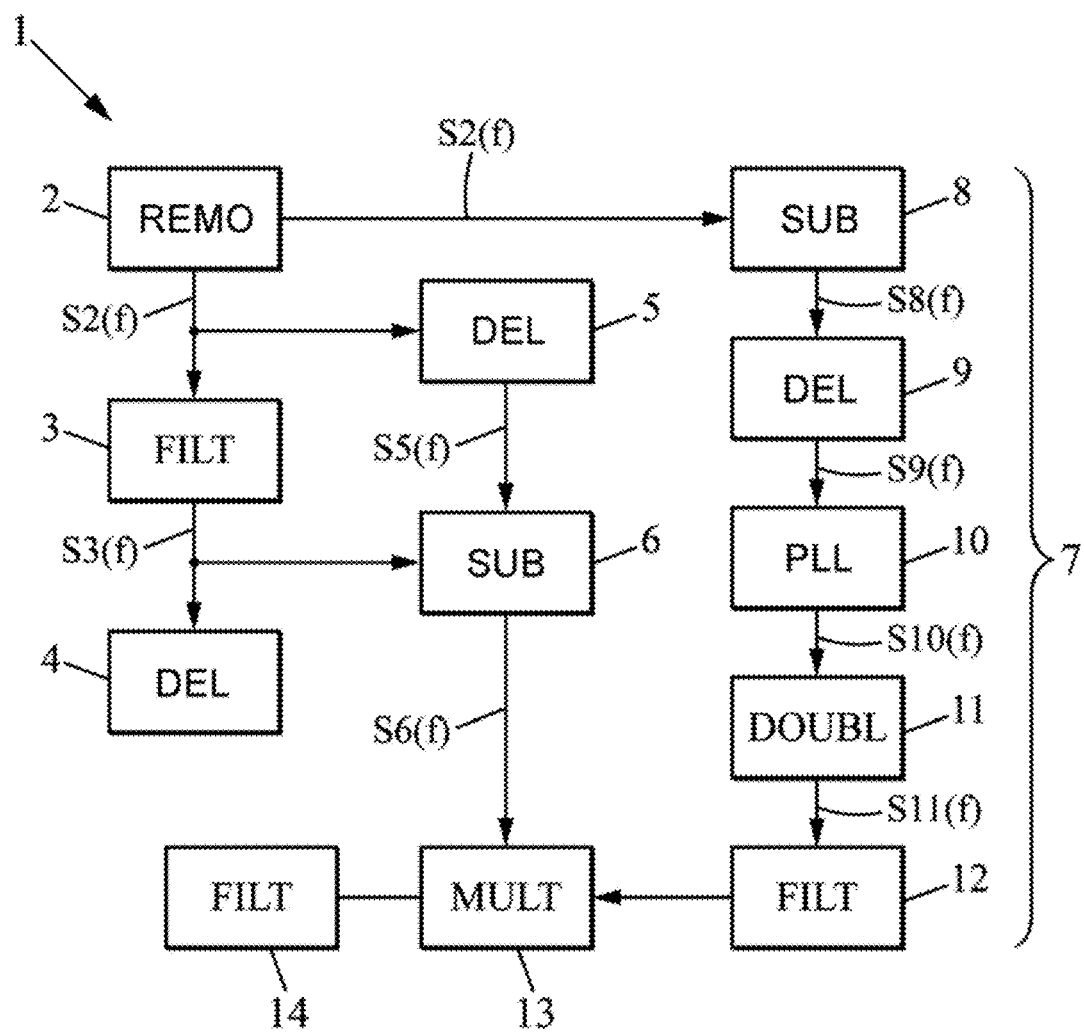
FIG. 3 illustrates a timing diagram of the demodulation method according to an aspect of the present invention.

As apparent from FIG. 3, the demodulation method 1 also comprises a filtering step 3 (FILT), preferably using a low-pass filter 102 of the device 100, resulting in a signal S3(f).

The filter 102 is preferably a 128-tap finite impulse response filter.

The filtering step 3 is followed by a step 4 of applying a delay T1, via a delay means 103. This step 4 allows the recovery of the sum signal L+R, by taking into account the delay generated by a filter 112. This in order to temporally align the signals L+R and L−R. This step is denoted by DEL in FIG. 3.

As also apparent from FIGS. 2 and 3, the demodulation method 1 comprises a step 5 of applying a delay T2 to the signal S2(f), using a means 104, in order to take account of the delay of the filter 102 (in the subtraction step described below). For example, T1 and T2 are equal (if the same low-pass filter is used to recover L+R and L−R, otherwise T1 and T2 are different). This step, denoted by DEL, results in a signal S5(f).

The demodulation method 1 comprises a step 6 of subtraction SUB, during which the signal S3(f) is subtracted from the signal S5(f) using a subtraction device 105. The untransposed signal L−R is thus obtained, denoted by S6(f).

As can be seen in FIG. 3, the demodulation method 1 comprises a step 7 of recovering the pilot signal P on the basis of the multiplexed stereophonic signal S(f) and the pilotless signal S2(f) in order to regenerate the 38 kHz carrier signal.

Step 7 of regenerating the 38 kHz carrier signal comprises a succession of steps.

A first step 8 consists in subtracting the signal S2(f) from the multiplexed stereophonic signal S(f) using a device 106. This step, denoted by SUB, results in a signal S8(f).

A second step 9 consists in applying, using a means 107, a delay T2 to the signal S8(f), with a view to subsequently recovering the difference signal, as will be explained later. This step, denoted by DEL, results in a signal S9(f).

A third step 10 consists in using a phase-locked loop 108 of the device 100 in order to guarantee the signal in terms of phase, frequency and amplitude. This step, denoted by PLL, results in a signal S10(f).

A fourth step 11 consists in doubling the frequency of the pilot signal to obtain the frequency of the carrier, 38 kHz, using a means 109. This step, denoted by DOUBL, results in a signal S11(f).

A fifth step 12 (FILT), at the end of which the 38 kHz carrier signal is regenerated, denoted by S12(f), consists in filtering using a band-pass filter 110 of the device 100. The filter 110 is preferably a second-order infinite impulse response filter.

The difference signal is then recovered by multiplying the carrier signal S12(f) and the signal S6(f) corresponding to the untransposed difference signal using a device 111, then by filtering using a filter 112 of the device 100. The multiplication step, denoted by MULT, is referenced 13, while the filtering step, FILT, is referenced 14. The filter 112 is preferably a 128-tap finite impulse response filter.

Thus, by virtue of the recovered sum and difference signals, it is then possible to optimally extract each of the signals L and R.

Figure 4:
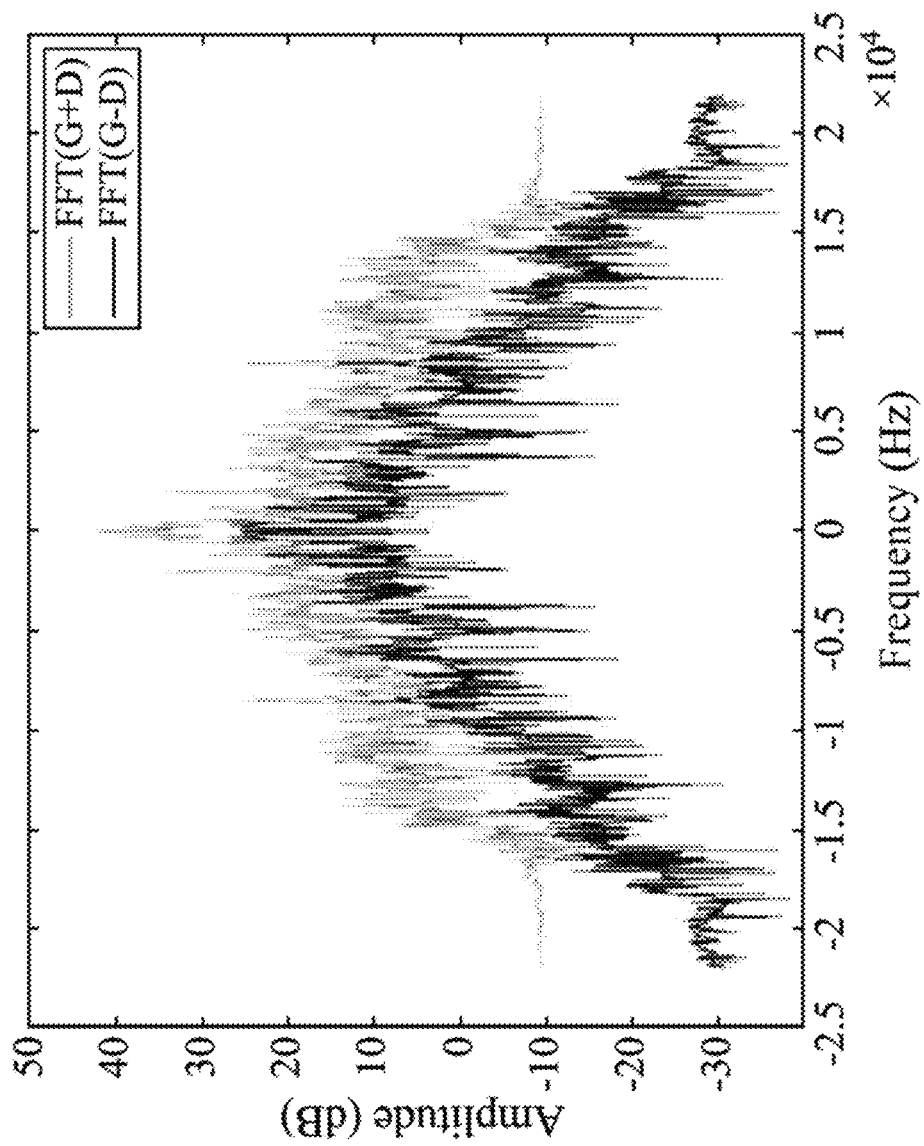
FIG. 4 illustrates a variation in the curves of the amplitude of the frequency spectra (fast Fourier transformation) of sum and difference signals that have not been processed, received by the radio of the vehicle, and shows a case where a sum signal has higher energy than a difference signal, leading to a deterioration in a degree of total harmonic distortion and the separation of monophonic channels via a conventional method of stereophonic demodulation.

As illustrated in FIG. 4, it happens that the amplitude of the sum signal is higher than the amplitude of the difference signal, which in the case of the methods of the prior art would result in a deterioration in the total harmonic distortion and the separation of the L and R channels due to the fact that the sum signal would not be correctly rejected in the transposition operation allowing the difference signal to be recovered. Conversely, an aspect of the present invention makes it possible to cleanly recover the signals L and R by virtue of the use of a subtraction operation which improves the degree of total harmonic distortion and the separation of the left/right channels.

The invention claimed is:

1. A method for demodulating a multiplexed stereophonic signal, the signal comprising:
   a sum signal, which is a sum of two monophonic signals,
   a difference signal, which is a difference of said two monophonic signals, and
   a pilot signal at a pilot frequency serving as a reference for performing a frequency transposition of the difference signal on the basis of a carrier signal, the method comprising:
   removing the pilot frequency from the multiplexed stereophonic signal, to form a pilotless signal comprising the sum signal and the difference signal; and subtracting the sum signal from the pilotless signal, to form an untransposed difference signal.

2. The method as claimed in claim 1, wherein a rejection filter is used in the step of removing the pilot frequency.

3. The method as claimed in claim 1, comprising applying a delay to the pilotless signal prior to the subtraction step.

4. The method as claimed in claim 1, comprising a step of regenerating the carrier signal on the basis of the multiplexed stereophonic signal and the pilotless signal.

5. A method for demodulating a multiplexed stereophonic signal, the signal comprising:
   a sum signal, which is a sum of two monophonic signals,
   a difference signal, which is a difference of said two monophonic signals, and
   a pilot signal at a pilot frequency serving as a reference for performing a frequency transposition of the difference signal on the basis of a carrier signal, the method comprising:
   removing the pilot frequency from the multiplexed stereophonic signal, to form a pilotless signal; and
   subtracting the sum signal from the pilotless signal, to form an untransposed difference signal,
   wherein the step of regenerating the carrier signal comprises a subtraction step in which the pilotless signal is subtracted from the multiplexed stereophonic signal, the subtraction step being followed by a step of applying a delay.

6. The method as claimed in claim 5, wherein the step of regenerating the carrier signal comprises a step of using a phase-locked loop subsequent to the step of applying a delay.

7. The method as claimed in claim 6, wherein the step of regenerating the carrier signal comprises a step of doubling the pilot frequency subsequent to the step of using a phase-locked loop.

8. The method as claimed in claim 7, wherein the step of regenerating the carrier signal comprises a step of filtering by a band-pass filter, subsequent to the step of doubling the frequency, the resulting signal being called the regenerated carrier signal.

9. The method as claimed in claim 4, comprising a step of multiplying the untransposed difference signal and the regenerated carrier signal.

10. The method as claimed in claim 9, next comprising a step of filtering by a low-pass filter so as to recover the difference signal.

11. A method for demodulating a multiplexed stereophonic signal, the signal comprising:
    a sum signal, which is a sum of two monophonic signals,
    a difference signal, which is a difference of said two monophonic signals, and
    a pilot signal at a pilot frequency serving as a reference for performing a frequency transposition of the difference signal on the basis of a carrier signal, the method comprising:
    removing the pilot frequency from the multiplexed stereophonic signal, to form a pilotless signal;
    subtracting the sum signal from the pilotless signal, to form an untransposed difference signal; and,
    filtering by a low-pass filter prior to the step of subtracting the pilotless signal from the sum signal.

12. The method as claimed in claim 11, comprising a step of recovering the sum signal by applying a delay to the signal resulting from the step of filtering by a low-pass filter prior to the step of subtracting the pilotless signal from the sum signal.

13. The method as claimed in claim 2, comprising applying a delay to the pilotless signal prior to the subtraction step.

* * * * *